United States Patent
Takahashi

(10) Patent No.: US 10,576,812 B2
(45) Date of Patent: Mar. 3, 2020

(54) MOUNTING MEMBER STRUCTURE

(71) Applicant: HONDA MOTOR CO., LTD., Tokyo (JP)

(72) Inventor: Toshiya Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 15/868,161

(22) Filed: Jan. 11, 2018

(65) Prior Publication Data

US 2018/0201111 A1 Jul. 19, 2018

(30) Foreign Application Priority Data

Jan. 19, 2017 (JP) ................................ 2017-007649

(51) Int. Cl.
*B60K 5/12* (2006.01)
*F16F 7/108* (2006.01)

(52) U.S. Cl.
CPC .............. *B60K 5/12* (2013.01); *B60K 5/1208* (2013.01); *B60K 5/1216* (2013.01); *F16F 7/108* (2013.01)

(58) Field of Classification Search
CPC ...... B60K 5/12; B60K 5/1208; B60K 5/1216; B60K 5/1233; B60K 5/04; F16F 7/108; F16F 7/00; F16F 1/3849; F16F 7/1011; F02F 7/0082
USPC ....................................................... 248/562
See application file for complete search history.

(56) References Cited

U.S. PATENT DOCUMENTS

| 3,368,807 | A | * | 2/1968 | Thrasher | F16F 7/10 267/35 |
| 4,697,781 | A | * | 10/1987 | Hamano | F16F 7/108 188/379 |
| 5,018,699 | A | * | 5/1991 | Bretaudeau | B60K 5/1208 248/562 |
| 5,636,826 | A | * | 6/1997 | Nakagaki | F16F 7/00 248/224.51 |
| 2008/0029942 | A1 | * | 2/2008 | Kern | F16F 13/101 267/140.13 |

FOREIGN PATENT DOCUMENTS

| JP | H01-150125 | U | 10/1989 |
| JP | H09-263143 | A | 10/1997 |
| JP | H11-325170 | A | 11/1999 |
| JP | 2007-309386 | A | 11/2007 |

OTHER PUBLICATIONS

Translation of JP H01-150125.*

* cited by examiner

Primary Examiner — Christopher Garft
(74) Attorney, Agent, or Firm — Rankin, Hill & Clark LLP

(57) ABSTRACT

An object of the present invention is to provide a mounting member structure capable of preventing unstable vibration of an engine mount. A mounting member structure, which is mounted on a power plant including an engine and has a mounting member disposed between the power plant and an antivibration device, wherein the mounting member has an opening abutting the power plant and an inner space continuous from the opening, a weight mass is disposed in the inner space, and the weight mass is fixed to a recess in the inner space through a first bolt. The mounting member is fastened to the antivibration device by a second bolt.

4 Claims, 4 Drawing Sheets

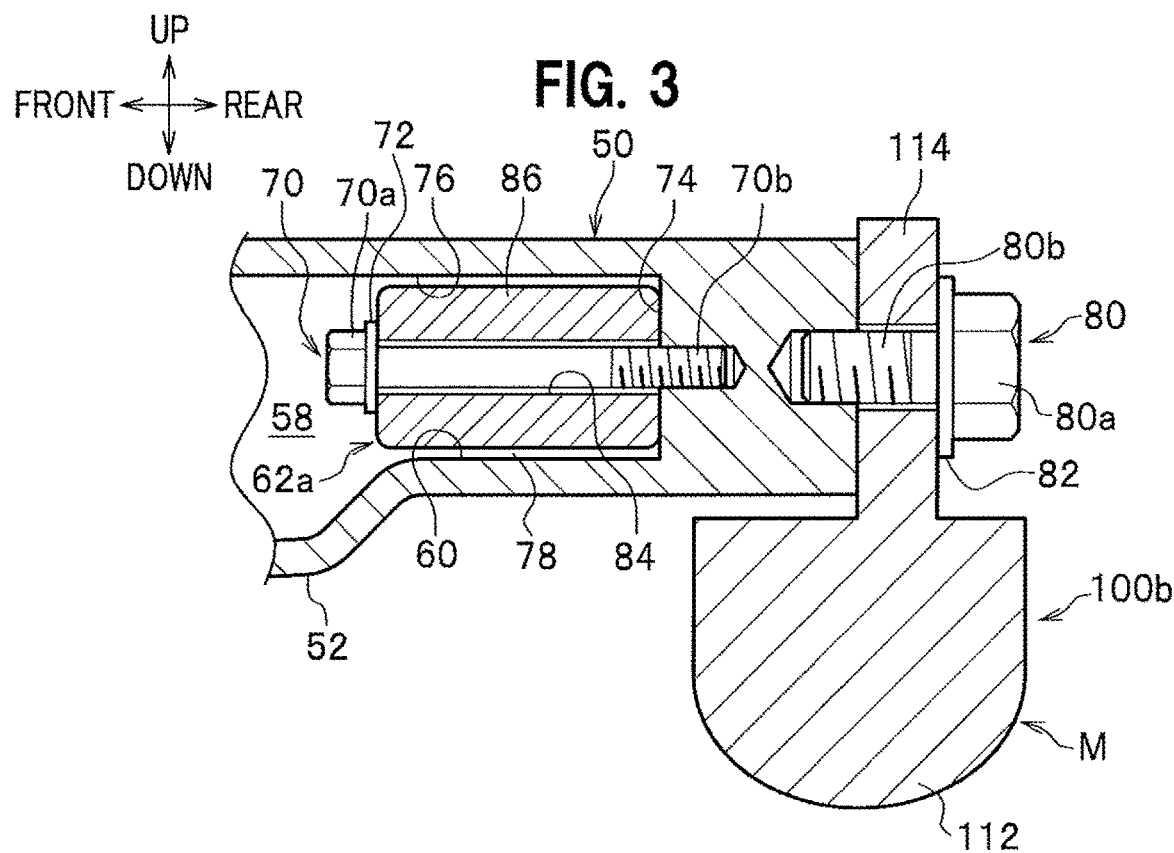
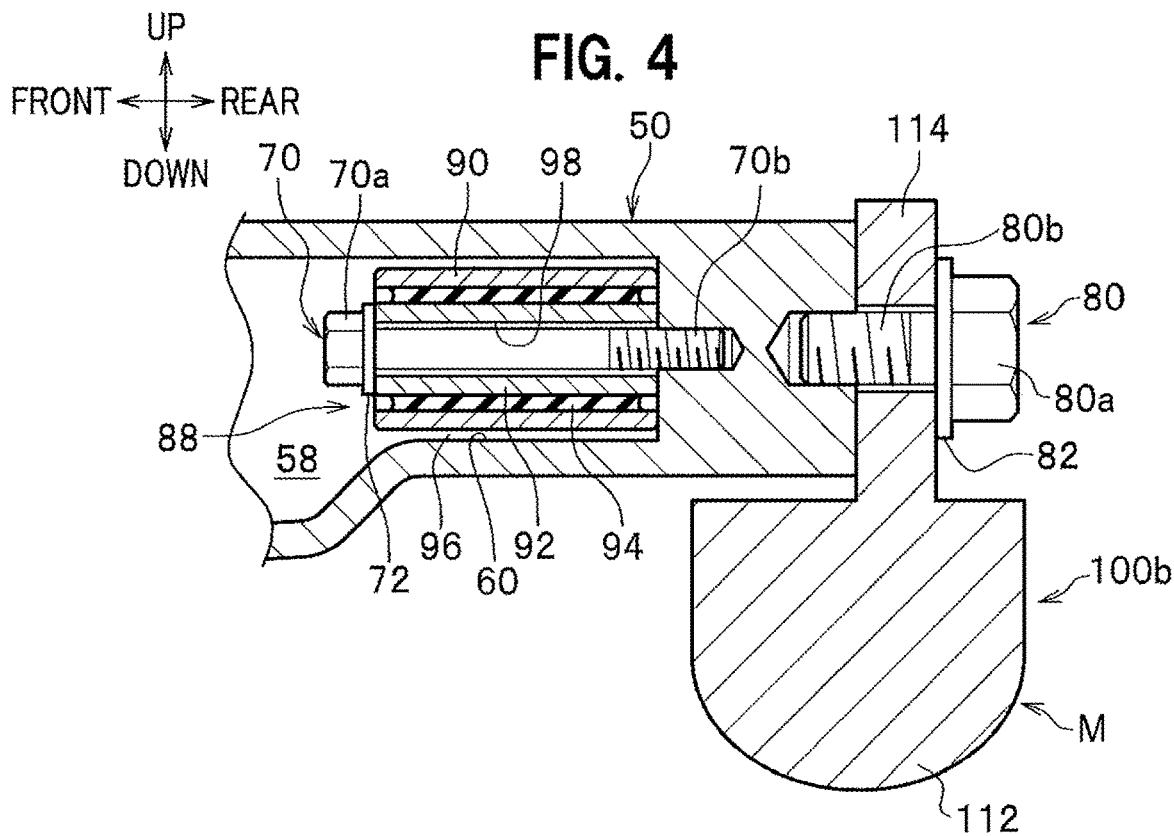

MOUNTING MEMBER STRUCTURE

CROSS REFERENCE TO RELATED APPLICATIONS

This application claims the foreign priority benefit under Title 35, United States Code, § 119 (a)-(d) of Japanese Patent Application No. 2017-007649, filed on Jan. 19, 2017, the disclosure of which is herein incorporated by reference in its entirety.

TECHNICAL FIELD

The present invention relates to a mounting member structure mounting on a drive source and supporting the drive source.

BACKGROUND ART

For example, Patent Document 1 discloses a mounting structure of a dynamic damper fastened by a bolt in a direction extending in a lateral direction of an engine mount. In the mounting structure disclosed in Patent Document 1, the dynamic damper is further tightened together with a vehicle body side bracket through this bolt.

CITATION LIST

Patent Literature

Patent Document 1: Japanese Patent Application Publication No. H09-263143

SUMMARY OF INVENTION

Technical Problem

However, in the mounting structure disclosed in Patent Document 1, since the dynamic damper (or weight mass) is disposed only on one side in the lateral direction of the engine mount, a subframe is configured left-right asymmetrically in a plan view. Therefore, the dynamic damper may generate unstable vibration due to vibration input from an engine side.

Specifically, when vibrations generated in the engine are sequentially transmitted from the engine to a vehicle body frame through an engine side bracket, a mount, and a vehicle body side bracket, the dynamic damper (or weight mass) may generate unstable vibration, since the dynamic damper (or weight mass) is disposed at a position deviating from such a vibration transmission path. In this unstable vibration, for example, a tip of the vehicle body side bracket vibrates most up and down (the maximum amplitude point) in some cases. At sites away from the point, different modes may be excited by generation of rotational moment. Further, characteristic values in different vibration directions such as torsional mode may be excited in addition to vertical mode.

Further, in the mounting structure disclosed in Patent Document 1, since the dynamic damper (or weight mass) is exposed outwardly of the vehicle body side bracket, it is necessary to provide a fail-safe mechanism assuming that the dynamic damper (or weight mass) falls off.

The present invention has been made in view of the above points, and an object of the present invention is to provide a mounting member structure capable of preventing unstable vibration of the engine mount.

Solution to Problem

In order to achieve the above object, a mounting member structure according to the present invention is mounted on a power plant including a drive source of a vehicle and has a mounting member disposed between the power plant and an antivibration device, wherein the mounting member has an opening abutting the power plant and an inner space continuous from the opening, a weight mass is disposed in the inner space, and the weight mass is fixed to the mounting member through an fixing member.

Advantageous Effects of Invention

According to the present invention, it is possible to obtain a mounting member structure capable of preventing unstable vibration of the engine mount.

BRIEF DESCRIPTION OF DRAWINGS

FIG. 3 is an enlarged cross-sectional view of the mounting member structure according a first modification;

FIG. 4 is an enlarged cross-sectional view of the mounting member structure according a second modification.

DESCRIPTION OF EMBODIMENTS

Figure 1:
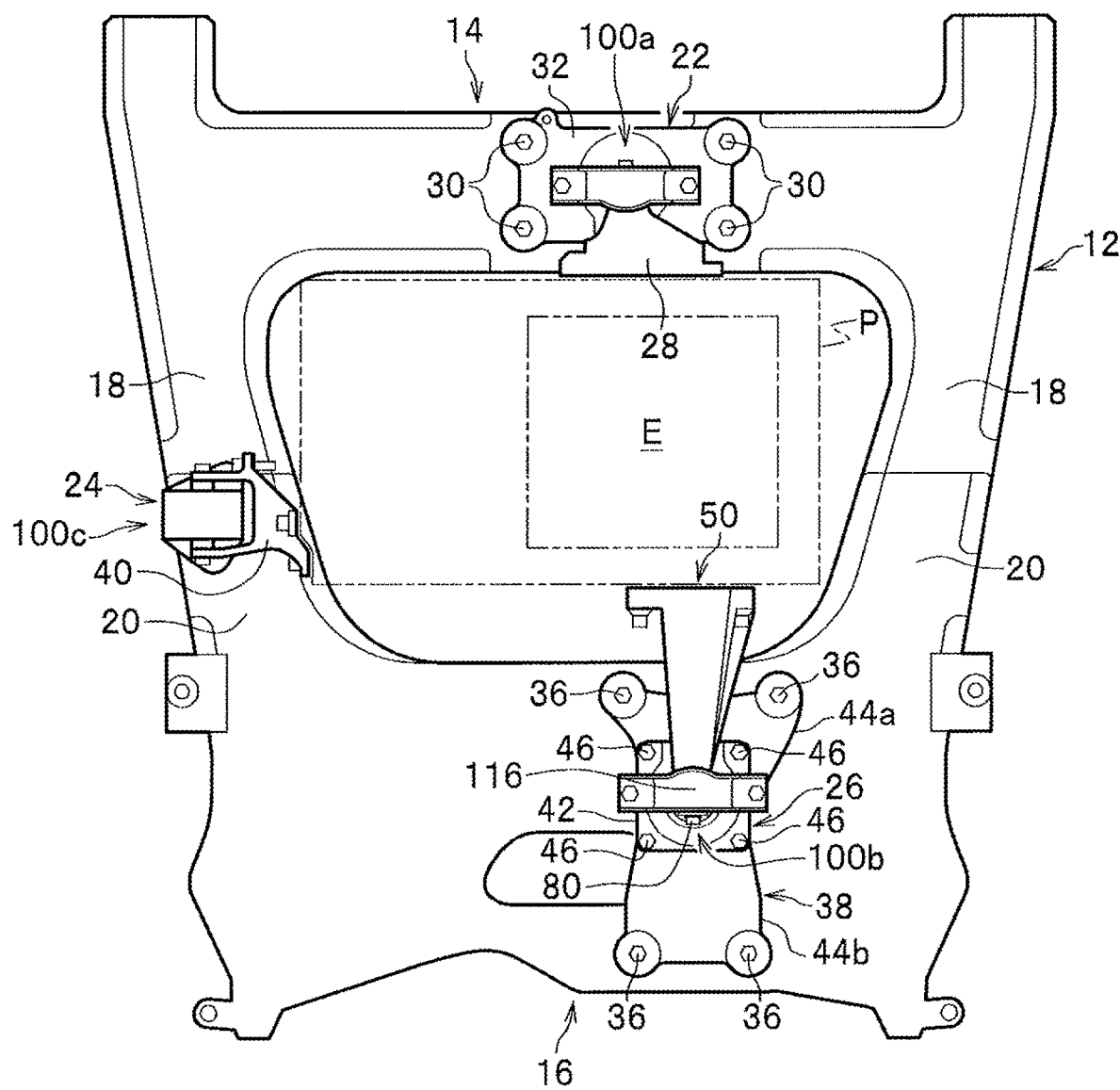
FIG. 1 is a plan view of a subframe in which a mounting member structure according to an embodiment of the present invention is assembled.

Next, an embodiment of the present invention will be described in detail with reference to the drawings. FIG. 1 is a plan view of a subframe in which a mounting member structure according to an embodiment of the present invention is assembled. In the drawings, "FRONT-REAR", "LEFT-RIGHT" and "UP-DOWN" respectively indicate a vehicle front-rear direction, a vehicle left-right direction (vehicle width direction) and a vertical direction.

As shown in FIG. 1, a subframe (vehicle body frame) 12 is mounted on a front portion of a vehicle body. This subframe 12 includes a front cross member 14 and a rear cross member 16. On both sides in the vehicle width direction of the front cross member 14, left and right front portions 18, 18 extending rearwardly of a vehicle are respectively arranged to face each other. On both sides in the vehicle width direction of the rear cross member 16, left and right rear portions 20, 20 are respectively provided extending forwardly of the vehicle and connected to the left and right front portions 18, 18.

In the present embodiment, as an example of subframe 12, the left and right front portions 18, 18 and the left and right rear portions 20, 20 are respectively integrally formed with the front cross member 14 and the rear cross member 16, however, it is not limited thereto. For example, it may be configured such that the left front portion 18 and the left rear portion 20 are integrally formed to constitute a left side member (not shown), and the right front portion 18 and the right rear portion 20 are integrally formed to constitute a right side member (not shown).

The front cross member 14 extends in the vehicle width direction and is disposed in front of the power unit P. The rear cross member 16 extends in the vehicle width direction and is disposed behind the power unit P. The left front portion 18 and the left rear portion 20 extend in the vehicle front-rear direction in a plan view and are disposed on the left side of the power unit P. The right front portion 18 and the right rear portion 20 extend in the vehicle front-rear direction in a plan view and are disposed on the right side of the power unit P.

The subframe 12 has a substantially pound (#) structure in a plan view by integrally fixing the left and right front portions 18, 18 of the front cross member 14 and the left and right rear portions 20, 20 of the rear cross member 16, for example, by welding or the like. Note that the subframe 12 is not limited to the substantially pound structure and may include, for example, a single cross member with the left and right side members.

The power unit P is, for example, a unit formed integrally of an engine E (drive source, vibration generating source) and a transmission, and is floatingly supported by the subframe 12.

A floating mechanism for floatingly supporting the engine E is disposed in the subframe 12. This floating mechanism includes a front mount 22 disposed on the front cross member 14, a side mount 24 disposed on the left rear portion 20 of the rear cross member 16, and a rear mount 26 disposed on the rear cross member 16. The engine E is floatingly supported at three points including the front mount 22, the side mount 24, and the rear mount 26.

An antivibration device 100*a* for supporting a vehicle front side of the engine E via a mounting bracket 28 is disposed on the front mount 22. The antivibration device 100*a* is rigidly fixed to a front beam of the front cross member 14 via a plurality of bolts 30 and a front mounting bracket 32. An antivibration device 100*b* for supporting a vehicle rear side of the engine E is disposed on the rear mount 26 via a mounting member 50 described below. The antivibration device 100*b* is floatingly supported by the rear cross member 16 via a plurality of bolts 36 and a mounting bracket 38. Another antivibration device 100*c* for supporting a vehicle width left side of the engine E via a mounting bracket 40 is disposed on the side mount 24. The other antivibration device 100*c* is rigidly fixed to the left rear portion 20 of the rear cross member 16 through a plurality of bolts.

The antivibration device 100*a* on the front side and the antivibration device 100*b* on the rear side have substantially the same configuration. The configuration of this antivibration device will be described in detail below.

As shown in FIG. 1, the antivibration device 100*b* on the rear side is supported by the mounting bracket 38. The mounting bracket 38 connects the antivibration device 100*b* and the subframe 12. The mounting bracket 38 includes a support fixing portion 42 and two legs. The support fixing portion 42 has a mounting surface with an upper surface on which the antivibration device 100*b* is mounted, and the antivibration device 100*b* is supported and fixed on the mounting surface through fixing bolts 46.

The legs include a front leg 44*a* branching in a vehicle front direction from below the support fixing portion 42 and a rear leg 44*b* branching in a vehicle rear direction. The front leg 44*a* and the rear leg 44*b* are respectively floatably mounted on an upper surface of the rear cross member 16 via resilient bushes (not shown).

Figure 2:
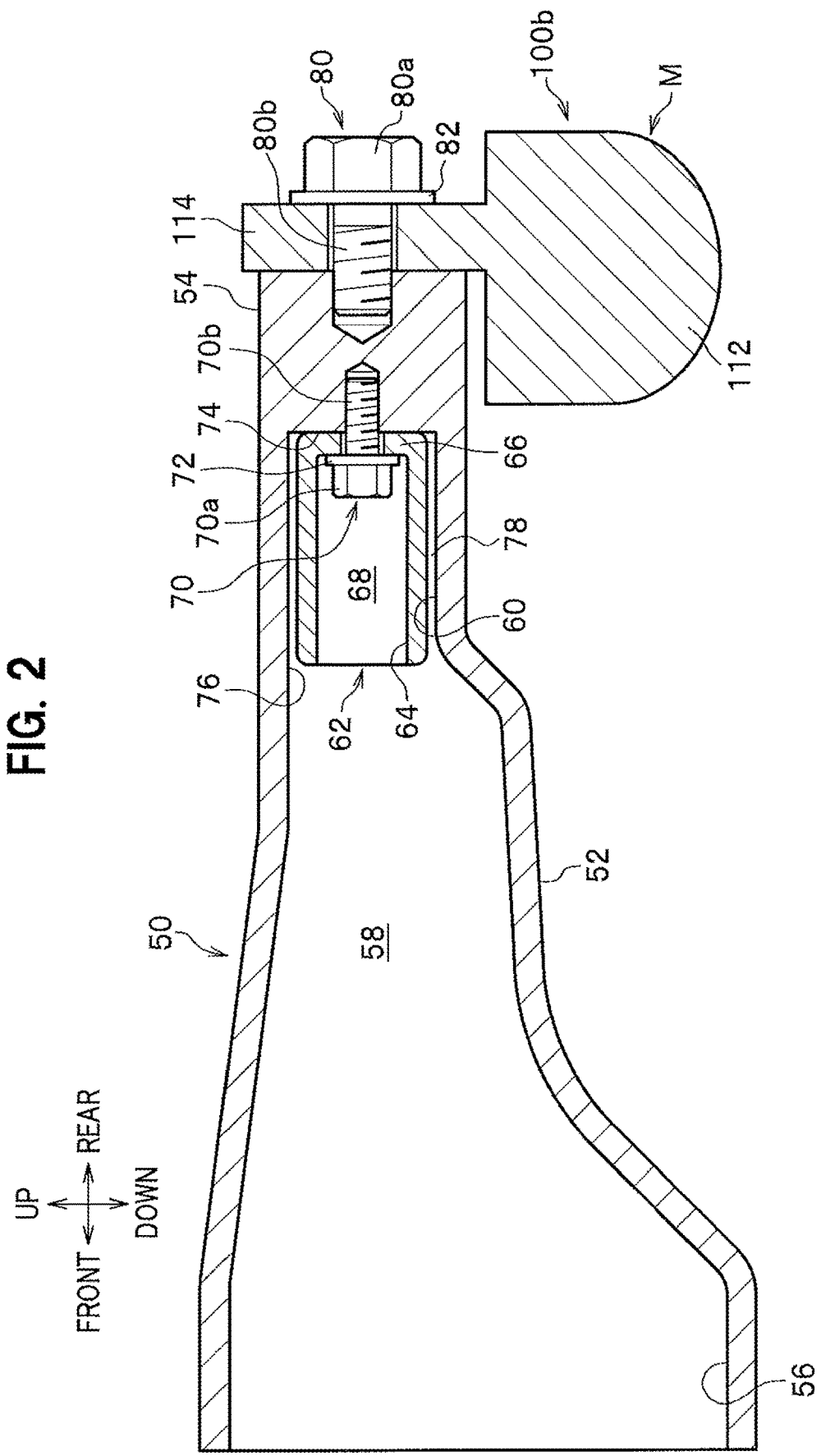
FIG. 2 is an enlarged cross-sectional view of the mounting member structure according to the present embodiment.

FIG. 2 is an enlarged cross-sectional view of the mounting member structure according to the present embodiment, FIG. 3 is an enlarged cross-sectional view of the mounting member structure according a first modification, and FIG. 4 is an enlarged cross-sectional view of the mounting member structure according a second modification. In FIGS. 2 to 4, "M" schematically shows a combination of an upper bracket 112 and a mounting plate 114 arranged in the antivibration device 100*b* shown in FIG. 5 described below. The "M" is integrally formed of, for example, aluminum or steel material.

As shown in FIG. 1, a substantially trumpet-shaped mounting member 50 is disposed between a power plant P and the antivibration device 100*b* in the vehicle front-rear direction. A vehicle front end of the mounting member 50 is mounted on the power plant P including a drive source E, and a vehicle rear end of the mounting member 50 is connected to the antivibration device 100*b*.

As shown in FIG. 2, the mounting member 50 is formed integrally with a main body 52 and a connecting portion 54 continuous with the main body 52. The main body 52 has an opening 56 located at a vehicle front end thereof and abutting the power plant P, and an inner space 58 continuous from the opening 56 in the vehicle rear direction. The connecting portion 54 is located on an opposite side of the opening 56 and is connected to the antivibration device 100*b*. The inner space 58 is formed with a recess 60 recessed toward the antivibration device 100*b* (toward the connecting portion 54). When the mounting member 50 is mounting on the power plant P, the opening 56 is closed by the power plant P.

A weight mass 62 including a bottomed cylindrical body is disposed in the inner space 58. The weight mass 62 includes the bottomed cylindrical body, and has a mass opening 64 formed at a vehicle front end thereof and a mass bottom 66 provided at a vehicle rear end thereof. A mass recess 68 continuous with the mass opening 64 is formed between the mass opening 64 and the mass bottom 66.

The weight mass 62 is fastened (fixed) to a side wall 74 of the recess 60 via a first bolt (fixing member) 70 and a washer 72. The weight mass 62 and an inner wall 76 of the recess 60 have a clearance 78 therebetween.

The first bolt 70 is formed integrally with a head 70*a* having a polygonal shape and a threaded portion 70*b*. The mounting member 50 is fastened to the mounting plate 114 of the antivibration device 100*b* by a second bolt 80 and a washer 82. Similarly to the first bolt 70, the second bolt 80 is also integrally formed with a head 80*a* and a threaded portion 80*b*.

The first bolt 70 and the second bolt 80 are arranged coaxially with each other at the connecting portion 54 and are opposed to each other with the connecting portion 54 therebetween. The mass opening 64 of the weight mass 62 is disposed in the same direction as the opening 56 of the mounting member 50, that is, in the vehicle front direction. The head 70*a* of the first bolt 70 abuts the mass recess 68 via the washer 72.

The shape of the weight mass 62 is not limited to the bottomed cylindrical body shown in FIG. 2. For example, as shown in a weight mass 62*a* according to the first modification of FIG. 3, it may be a cylindrical body 86 having a through-hole 84. The weight mass 62*a* is fastened to the recess 60 by the first bolt 70 inserted through the through-hole 84, and the washer 72.

As shown in the second modification of FIG. 4, a dynamic damper 88 may be disposed in the recess 60 in the inner space 58 instead of the weight mass 62 or 62*a*.

The dynamic damper 88 includes a weight 90 positioned on an outer diameter side, a dynamic damper bracket 92 positioned on an inner diameter side, an elastic connecting body 94 for elastically connecting (for example, vulcanization bonding) the weight 90 and the dynamic damper bracket 92. For example, the outer diameter side of the elastic connecting body 94 is vulcanization-bonded to an inner wall of the weight 90, and the inner diameter side of the elastic connecting body 94 is also vulcanization-bonded to an outer peripheral surface of the dynamic damper bracket 92.

The weight 90 is formed of a cylindrical body, and has a clearance 96 formed between the outer peripheral surface of the cylindrical body and the inner wall 76 of the recess 60. The dynamic damper bracket 92 is formed of a cylindrical body having a through-hole 98, and is fastened to the recess 60 by the first bolt 70 inserted through the through-hole 98, and the washer 72.

Figure 5:
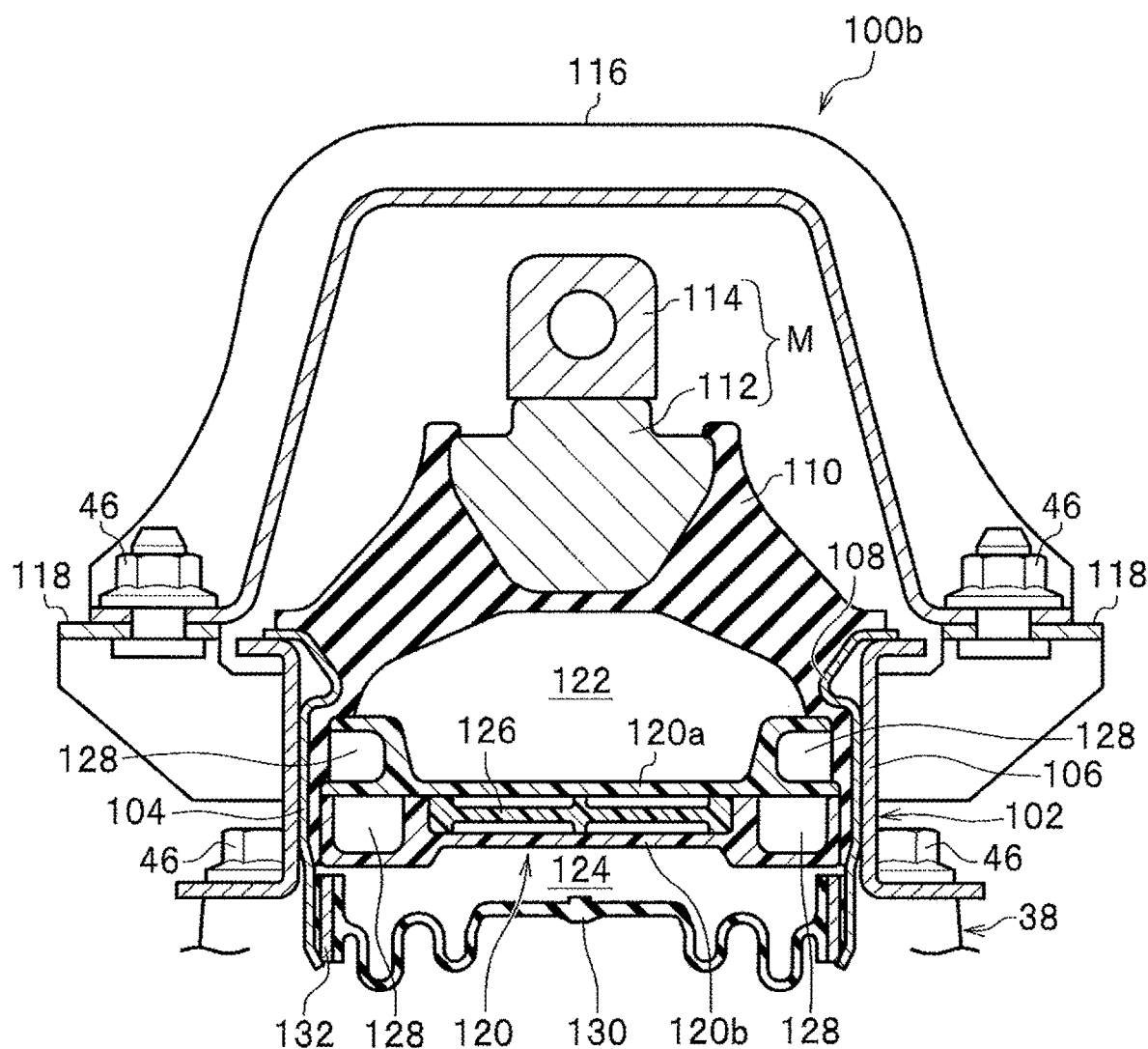
FIG. 5 is an enlarged cross-sectional view of an antivibration device mounted on the subframe shown in FIG. 1.

Next, structure and operation of the antivibration device 100b (100a) will be described. FIG. 5 is an enlarged cross-sectional view of an antivibration device mounted on the subframe shown in FIG. 1. Since the antivibration device 100a on the front side and the antivibration device 100b on the rear side have substantially the same structure, the structure of the antivibration device 100b on the rear side will be described in detail and a description of the structure of the antivibration device 100a on the front side will be omitted. The antivibration device 100b shown in FIG. 5 is a liquid sealing type, but the present invention is not limited to this.

As shown in FIG. 5, the antivibration device 100b includes a lower bracket 102 and a housing 104. The lower bracket 102 is fixed to the mount bracket 38 (subframe 12) through the bolts 46. The housing 104 is press-fitted into a through-hole of a cylindrical portion 106 provided at a center portion of the lower bracket 102. The antivibration device 100b is interposed between the subframe 12 and the engine E (vibration generating source) to prevent vibration transmitted from the engine E to the subframe 12.

An elastic member 110 is attached to the housing 104 through an annular projection 108. The upper bracket 112 is mounted on an upper portion of the elastic member 110. The upper bracket 112 is provided with the mounting plate 114 extending upwardly and on which the mounting member 50 (see FIGS. 1, 2) is mounted. Further, an arm 116 having an arcuate shape and straddling the elastic member 110 in the vehicle width direction is suspended above the mounting plate 114. The arm 116 is fastened to a pair of left and right mounting portions 118 through the bolts 46.

A space is formed inside the elastic member 110. The space is partitioned into an upper main fluid chamber (pressure receiving chamber) 122 and a lower auxiliary fluid chamber (equilibrium chamber) 124 by a partition member 120.

The partition member 120 includes an upper partition member 120a and a lower partition member 120b. A membrane (movable partition wall) 126 is interposed between the upper partition member 120a and the lower partition member 120b. An orifice passage 128 for communicating the main liquid chamber 122 and the auxiliary liquid chamber 124 is provided on an outer diameter side of the upper partition member 120a and the lower partition member 120b.

A diaphragm 130 for forming the auxiliary liquid chamber 124 is provided below the partition member 120. The diaphragm 130 is provided with a ring member 132 vulcanization-bonded to an outer peripheral edge thereof. The diaphragm 130 is fixed to the housing 104 by crimping a lower portion of the housing 104 to support the ring member 132.

A viscous fluid (non-compressed fluid) is sealed in the main liquid chamber 122, the auxiliary liquid chamber 124, and the orifice passage 128. When a load (force) is input to the antivibration device 100b, the fluid sealed in the main liquid chamber 122 and the auxiliary liquid chamber 124 flows between the main liquid chamber 122 and the auxiliary liquid chamber 124 through the orifice passage 128. The input load is reduced by this fluid flow.

The subframe 12 to which the mounting member structure according to the present embodiment is assembled is basically configured as described above, and its operation and effect will be described below.

In the present embodiment, the weight mass 62, the weight mass 62a or the dynamic damper 88 is disposed in the inner space 58 of the mounting member 50 existing in a vibration transmission path through which vibration (engine vibration) generated in the engine E is transmitted to the subframe 12 through the mount bracket 38. Thus, in the present embodiment, unstable vibration on an engine mount side can be prevented. For example, in case of the weight mass 62 or 62a, it is possible to reduce excited vibration of a tip of the mounting member 50 due to the engine vibration. In case of the dynamic damper 88, it is possible to reduce vibration in a part of frequency band of the tip of the mounting member 50 due to the engine vibration. In any case of the weight mass 62, the weight mass 62a and the dynamic damper 88, degree of freedom of layout in the power plant chamber can be improved as compared with the conventional structure.

In the present embodiment, the weight mass 62, the weight mass 62a or the dynamic damper 88 is disposed in the inner space 58 of the mounting member 50 so as not to be exposed to the outside, while the opening 56 of the mounting member 50 is closed by the power plant P. Therefore, in the present embodiment, for example, even when the weight mass 62, the weight mass 62a or the dynamic damper 88 is detached from the recess 60 due to some cause, a fail-safe mechanism is provided so that the weight mass 62, the weight mass 62a or the dynamic damper 88 stays in the inner space 58 of the mounting member 50.

In the present embodiment, it possible to reliably fasten (fix) the weight mass 62, the weight mass 62a or the dynamic damper 88 to the recess 60 through the first bolt 70 by forming the recess 60 in the inner space 58 of the mounting member 50.

In the present embodiment, the first bolt 70 for fastening (fixing) the weight mass 62, the weight mass 62a or the dynamic damper 88 to the mounting member 50 and the second bolt 80 for fastening (fixing) the antivibration device 100b to the mounting member 50 are arranged coaxially with each other, and thus it is possible to smoothly and stably transmit the vibration on the engine side to the antivibration device 100b.

In the present embodiment, the opening 56 of the mounting member 50 and the mass opening 64 of the weight mass 62 or the weight mass 62a are in the same direction toward the front of the vehicle, and thus it is possible to avoid occurrence of unstable vibration due to the weight mass 62 or the weight mass 62a.

In the present embodiment, the weight mass 62, the weight mass 62a or the dynamic damper 88 is disposed in the inner space 58 of the mounting member 50 disposed between the power plant P and the antivibration device 100b, and thus it is possible to achieve space efficiency in the power plant chamber as compared with a case in which the weight mass 62, the weight mass 62a or the dynamic damper 88 is disposed in another site.

REFERENCE SIGNS LIST

50: mounting member
56: opening

58: inner space
60: recess
62, 62a: weight mass
64: mass opening
68: mass recess
70: first bolt (fixing member)
70a: head
80: second bolt
88: dynamic damper
90: weight
92: dynamic damper bracket
94: elastic connecting body
100b: antivibration device
E: engine (drive source)
P: power plant

The invention claimed is:

1. A mounting member structure, which is mounted on a power plant including a drive source of a vehicle and has a mounting member disposed between the power plant and an antivibration device, wherein
the mounting member has an opening abutting the power plant and an inner space continuous from the opening,
a weight mass is disposed in the inner space,
the weight mass is fixed to the mounting member through a fixing member,
the weight mass comprises a bottomed cylindrical body having a mass opening and a mass recess continuous with the mass opening,
the fixing member comprises a first bolt for fastening the weight mass to the opening of the mounting member,
the mass opening is disposed to face in a same direction as the opening of the mounting member,
a head of the first bolt abuts the mass recess.

2. The mounting member structure according to claim 1, wherein
a recess recessed toward the antivibration device is formed in the inner space, and
the weight mass is fixed to the recess.

3. The mounting member structure according to claim 1, wherein
the mounting member is fastened to the antivibration device by a second bolt.

4. The mounting member structure according to claim 3, wherein the first bolt and the second bolt are arranged coaxially with each other.

* * * * *